(12) United States Patent
Colombo (10) Patent No.: US 6,210,725 B1
(45) Date of Patent: Apr. 3, 2001

(54) METHOD FOR CREATING MODIFIED ATMOSPHERE PACKAGING

(75) Inventor: Edward A. Colombo, Penfield, NY (US)

(73) Assignee: Tres Fresh, LLC, Penfield, NY (US)

( * ) Notice: Subject to any disclaimer, the term of this patent is extended or adjusted under 35 U.S.C. 154(b) by 0 days.

(21) Appl. No.: 09/196,450

(22) Filed: Nov. 19, 1998

Related U.S. Application Data (60) Provisional application No. 60/084,729, filed on May 8, 1998.

(51) Int. Cl.$^7$ .................................................. B65D 85/00
(52) U.S. Cl. ........................ 426/129; 426/118; 426/396; 426/418
(58) Field of Search ...................... 426/418, 419, 426/118, 124, 396, 129; 222/95, 105, 386.5, 389, 107

(56) References Cited

U.S. PATENT DOCUMENTS 4,548,824 * 10/1985 Mitchell et al. ................. 426/129 X
4,944,603 * 7/1990 Cornish et al. ........................ 383/5
5,332,121 * 7/1994 Schmidt et al. ....................... 222/95
5,667,827 * 9/1997 Breen et al. .......................... 426/129

FOREIGN PATENT DOCUMENTS

404242572 * 8/1992 (JP) ..................................... 426/118

* cited by examiner

Primary Examiner—Gabrielle Brouillette
Assistant Examiner—Hao Mai
(74) Attorney, Agent, or Firm—Greenwald & Basch LLP; Howard J. Greenwald (57) ABSTRACT

A package for storing oxygen-sensitive goods (such as meat) which contains a gas impermeable tray wrapped in a gas permeable film, a barrier bag within which the wrapped tray is disposed, a closure for closing an open end of the barrier bag, and two one-way valves. One of the one-way valves is located on the inside of one side of the barrier bag, and the other of the one-way valves is located on the outside of the other side of the barrier bag.

8 Claims, 10 Drawing Sheets

METHOD FOR CREATING MODIFIED ATMOSPHERE PACKAGING

This application claims benefit of Provisional application 60/084,729 filing date May 8, 1998.

FIELD OF THE INVENTION

The present invention relates generally to a novel method for producing a Modified Atmosphere Package useful for the preservation and shelf life extension of food and non-food oxygen sensitive items.

DESCRIPTION OF THE PRIOR ART

It is well established that the shelf life of products can be extended by packaging them in a modified gaseous environment. For example, the shelf life of fresh meat products can be extended by packaging these products in an oxygen poor gaseous environment (Meat Preservation Robert G. Cussens Food & Nutrition Press, Inc. 1994).

Alternatively, non-food products such as metals which react with oxygen in a degradative manner can be stored in oxygen poor gaseous environments to prevent oxidation or "rusting" and thus enhance their useful life.

The relationship between shelf life and the gaseous environment surrounding a product is complex. For fresh cut meats, exposure to an ambient oxygen atmosphere causes the proteins contained in the meat to oxidize thus turning the meat color from a bright red to a brown color. The relationship between meat color and oxygen concentration is well established (Principles of Meat Science Third Edition Herick et al., Kendall/Hunt Publishing Company 1994). This relationship is graphically illustrated in FIG. 1, a relationship whereby the meat turns redder as the oxygen levels increase. In addition the growth of bacteria is enhanced by the presence of ambient oxygen.

This combination of color change and bacteria growth renders the meat product unfit for sale after 3–5 days.

The shelf life of the meat product can be extended by storing the fresh cut meat in an atmosphere of 100% carbon dioxide or combinations of carbon dioxide and nitrogen as well as high and low levels of oxygen in combination with nitrogen (Meat Preservation Robert G. Cussens Food & Nutrition Press, Inc. 1994). The maximum shelf life extension of fresh meats is achieved with 100% carbon dioxide. U.S. Pat. No. 5,667,827 naming Dennis J. Breen and Lawrence Wilson as inventors provides a more detailed description of 100% carbon dioxide environments.

The ultimate shelf life extension of fresh meats is determined not only by the environment surrounding the fresh meat but by the holding or storage temperature. In the case of fresh meat, the natural degradative metabolic process can be slowed by storing the meat in a 100% carbon dioxide atmosphere (or an oxygen level of <500 PPM) and maintaining the meat temperature at approximately 30.2 F. The importance of maintaining the proper meat temperature has been discussed in a recent publication (The National Provisioner April 1998).

While the environment of 100% carbon dioxide extends the shelf life of fresh meat, the meat must be exposed to ambient conditions, or approximately 21% oxygen, prior to retail sale. This exposure to ambient oxygen causes the meat to "bloom" or assume a cherry or bright red color. This color change must be present in order for the meat to be consumer acceptable.

This "blooming" can be accomplished by providing a means to expose the meat to an oxygen rich environment prior to retail sale. The prior art is replete with examples of methods to accomplish "blooming", such as removable domes (Garwood U.S. Pat. Nos. 4,685,274, 4,801,347, 5,025,611, 5,103,618, 5,129,512, 5,155,974, 5,226,531, and 5,323,590), peelable films (Gorlich U.S. Pat. Nos. 5,334,405, 5,348,752, 5,439,132, and 5,419,097), master bags (Breen/Wilson U.S. Pat. Nos. 5,711,978 and 5,667,827) and disposable barrier bags (Tenneco U.S. Pat. Nos. 5,698,250 and 5,811,142).

While establishing and maintaining the desired meat temperature is reasonably easy, establishing and maintaining the meat in a 100% carbon dioxide environment can be difficult and complex.

Heretofore systems have been described to achieve this desirable modified atmosphere condition. Previous systems have been described in the following patents to achieve this desired state: U.S. Pat. Nos. 4,685,274, 4,801,347, 5,025,611, 5,103,618, 5,129,512, 5,155,974, 5,226,531, and 5,323,590 all naming Anthony J. Garwood as the inventor; U.S. Pat. Nos. 5,711,978 and 5,667,827 naming Dennis J. Breen and Lawrence Wilson as the inventors; U.S. Pat. No. 5,698,250 and 5,811,142 naming Gary R. DelDuca, Alan E. Deyo, Vinod K. Luthra and Wen P. Wu as the inventors; and U.S. Pat. Nos. 5,334,405, 5,348,752, 5,439,132, and 5,419,097 naming Michael P. Gorlich as the inventor. In all of the referenced patents, the techniques require and/or use, complicated and expensive techniques/machines/packages including evacuation, gas flushing, oxygen absorbers, peelable seals, and complex coextruded and laminated films.

The systems described in the prior art establish the modified atmosphere within the package before the package environment is separated from the ambient conditions. For example, scenarios include evacuation, gas flushing and incorporation of oxygen absorbers before an individual layer or layers of permeable and impermeable films and/or bags or a combination thereof that are sealed or adhered to the container used to hold the food product.

Additionally, the previously referenced equipment, materials, and systems used to produce a modified atmosphere are costly, complex, and difficult to maintain. In addition, the machinery and processing steps are not conducive to small packaging operations.

As an example, Multivac produces and supplies machines which evacuate and establish a modified atmosphere prior to sealing a film to the tray package as described in their sales literature.

Since there are a multitude of shelf life extension methods described, large and small food packers have been reluctant to convert to one of these methods due to the large capital investment required for machinery. The food packers fear another system will come along to replace the one they have chosen. Thus market conversion to extended shelf life products in the US has been slow to occur.

Additionally, the previously referenced methods establish the modified atmosphere contemporaneously with the exclusion of oxygen. In other words, the atmosphere cannot be readily changed after it is established because no means is provided to modify the atmosphere within the container without destroying the container.

Further, the pressure of the modified atmosphere established with the prior art is generally limited to one atmosphere although the benefits of higher pressures have been established. These benefits include rapid absorption of carbon dioxide by the meat which slows the growth of certain bacteria, (Controlled/Modified Atmosphere/Vacuum Packaging of Foods, Brody, Food & Nutrition Press, Inc. 1994), prevention of package collapse due to the absorption of carbon dioxide by fresh meat and a cushioning effect which protects the product during shipment.

Providing a simple reusable means for establishing a modified atmosphere subsequent to sealing a barrier bag around a wrapped tray has several significant advantages over methods which establish a modified atmosphere prior to sealing a barrier bag around a wrapped tray. Several of these advantages are discussed below. The integrity of each barrier bag can be checked to determine if there are any leaks. Machine cost is lower and machine complexity is reduced. Production rates (packages produced per minute) can be increased. A poor seal on the end of the barrier bag can be repaired and the modified atmosphere re-established within the barrier bag thus reducing the cost associated with discarding the entire package. The same package can be used to establish a low oxygen environment, a high oxygen environment or a vacuum environment. A self-contained microwaveable package can be provided suitable for the reheating and/or cooking of food items.

SUMMARY OF THE INVENTION

The present invention provides a flexible low cost method for establishing a variety of modified atmosphere conditions within a package containing a food or non-food product after the environment surrounding the food or non-food product is separated from the ambient environment.

It has been discovered that a modified atmosphere can be achieved in a simple and heretofore unreported manner using readily available materials and techniques. Specifically, a container, tray or other structure is used to contain the oxygen sensitive food or non-food product. The product may be wrapped with a film or other means if desired to hold it place within the tray/structure. The container is placed in a suitable oxygen impermeable barrier bag which has been fitted with one or more inexpensive one-way valves or a small hole which may be sealed at a later time, both methods providing a means for removing the oxygen rich atmosphere within the barrier bag/tray package.

The barrier bag is sealed using heat seal means or other sealing techniques including adhesives, air tight "zipper seals", or ultrasonic welding.

Prior to sealing the barrier bag, it may be charged with a weighed amount of solid carbon dioxide or other means of creating a controlled generation of carbon dioxide, such as mixtures of water and carbon dioxide generating solids or liquids, which serves to flush the oxygen from the package and vent it through the valve or holes previously fitted to the barrier bag thus creating an oxygen poor, carbon dioxide rich gaseous environment.

Alternatively, after sealing the barrier bag the oxygen rich atmosphere contained within the package may be removed and modified by applying a vacuum device to a singe valve and allowing a new gaseous atmosphere to enter through a second opposing valve or hole simultaneously or sequentially.

Alternatively after sealing the barrier bag and charging it with a weighed amount of solid carbon dioxide or other carbon dioxide source, the oxygen concentration within the barrier bag/tray package may be reduced by applying a vacuum source to the one-way valve or hole device.

An example of how the present invention can be used to package fresh cut meats follows:

A fresh cut of meat is placed into a suitable container and overwrapped or stretch wrapped with commercially available PVC film, a material such as Resinite Film available from Borden Packaging and Industrial Products of North Andover, Mass. The overwrapping may be completed by using an automatic overwrapper machine available from Hobart Corporation of Troy, Ohio. The PVC or other film may be perforated to facilitate the complete exchange of atmosphere within the package.

The PVC overwrapped tray containing the meat is then placed in a barrier bag previously fitted with one or more controlled leak devices, such as a one-way valve (available from Plitek LLC of Des Plaines Ill.) and sealed to create an isolated contained gaseous environment. Prior to sealing the barrier bag a weighed amount of solid carbon dioxide or other carbon dioxide source is placed in the bag/tray combination.

Alternatively, the solid carbon dioxide can be eliminated and a contemporaneous or sequential combination of evacuation and back flushing with gaseous carbon dioxide or mixtures of carbon dioxide and nitrogen through the one-way valves or combination of valves and holes which may be sealed at a later time can be used to create a modified atmosphere within the barrier bag tray structure.

The structure so created is held at a temperature of approximately 30.2 F. Shortly before retail sale (15–30 minutes) the barrier bag is removed thus exposing the fresh cut meat to an oxygen rich atmosphere. The oxygen rich atmosphere permeates the oxygen permeable PVC film causing the meat to "bloom".

One object of the present invention is to lower the cost of the package by using lower cost packaging and less complex machinery, thus making the process useful for small packaging operations and providing a cost incentive to large food packers to convert from present short shelf life packaging methods to extended shelf life techniques.

Another object of the present invention is to provide a package whereby the atmosphere within the package can be modified after the package is produced, thus reducing the need to throw away packages in which the atmosphere has been compromised.

Another object of the present invention is to provide individual packages of retail product in contrast to master bag methods (Breen/Wilson U.S. Pat. Nos. 5,711,978 and 5,667,827) which provides greater versatility for the customer.

Another object of the present invention is to provide a simple, versatile package in which barrier and non-barrier tray material may be used, in which the use of oxygen absorbers is optional, in which the use of a vacuum is optional and in which the resulting production cycle rate is higher than previous methods and systems.

Another object of the present invention is to provide a solution to the persistent problem of weighing and labeling the product. In the past, this has proved difficult for most modified atmosphere packages, however, with the present invention the weighing and labeling can be accomplished prior to establishing the modified atmosphere environment around the product.

Another object of the present invention is to provide a means for removing oxygen that may have egressed into the package during storage by using a vacuum or other means without damaging the package.

Another object of the present invention is to provide a package that has many different applications. For instance, the present invention provides a package that can be used for hand packaging of prepared foods or other non-food items such as rust sensitive parts.

Another object of the present invention is to provide a package which can establish and maintain a carbon dioxide pressure of greater than one atmosphere to prevent package collapse due to the absorption of carbon dioxide by the fresh food product.

Another object of the present invention is to provide a package which provides a cushion for the food product to prevent damage during shipment.

Another object of the present invention is to provide a package in which a 100% carbon dioxide environment can be used.

Another object of the present invention is to provide a package in which it is not necessary for the outer barrier bag to be sealed to the tray or container.

An additional benefit of the present invention is that the package pressure is self adjusting.

Another benefit of the invention is the ability to check each package for leaks without destroying the package and also to determine the atmosphere within each package in the two-valve configuration.

BRIEF DESCRIPTION OF THE DRAWINGS

In order that the invention can be more clearly ascertained, examples of preferred embodiments will now be described with reference to the accompanying drawings.

DESCRIPTION OF PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
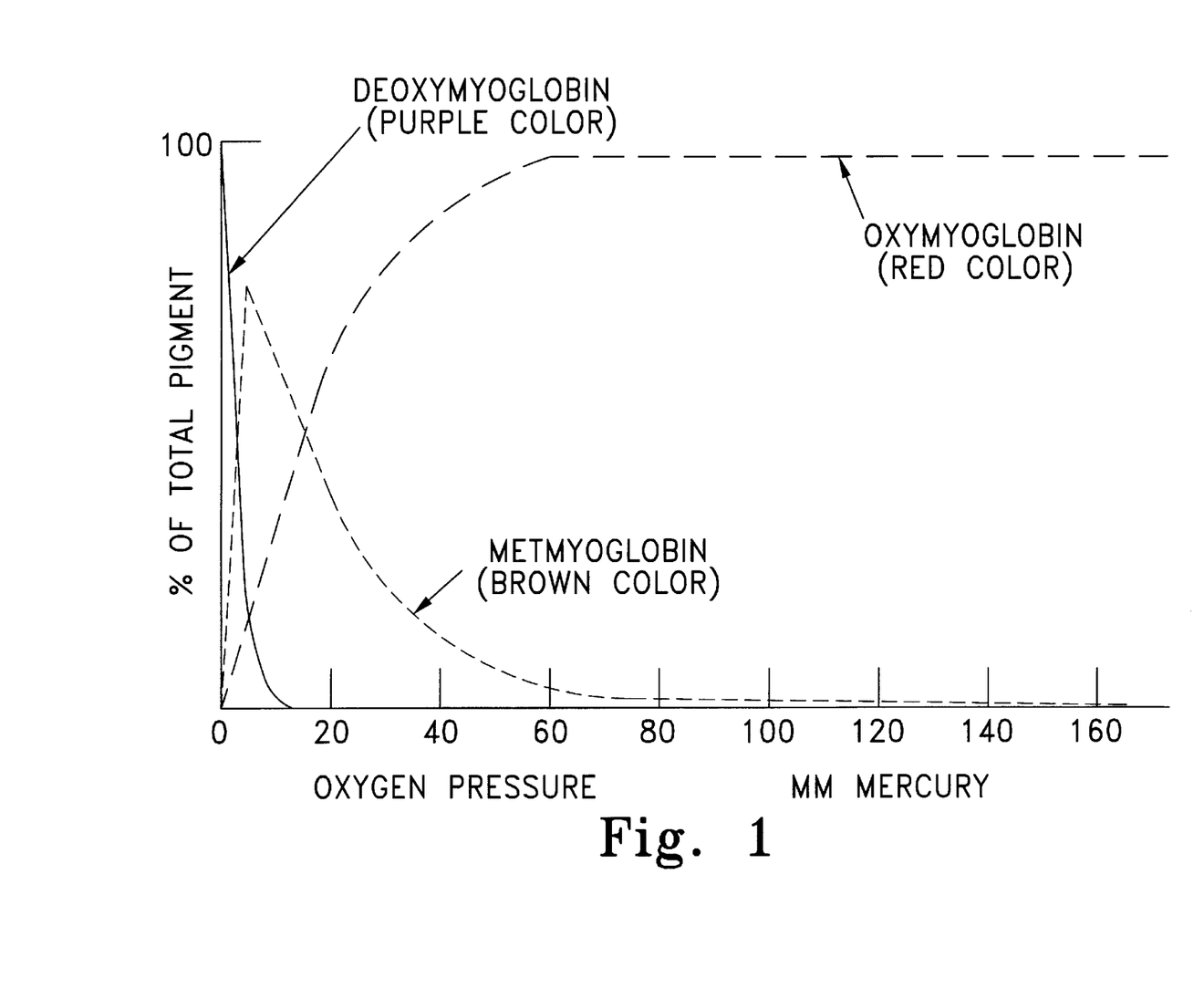
FIG. 1 shows the relationship between oxygen concentration and protein degradation on fresh meat (Principles of Meat Science Third Edition Hedrick et al. Kendall/Hunt Publishing Company 1994.)

FIG. 1 illustrates the relationship of oxygen pressure to the pigment color and state in red meat products, as discussed more generally in this specification. This graphical illustration demonstrates the importance of "blooming" meat to make it more appetizing to the consumer.

Figure 2A:
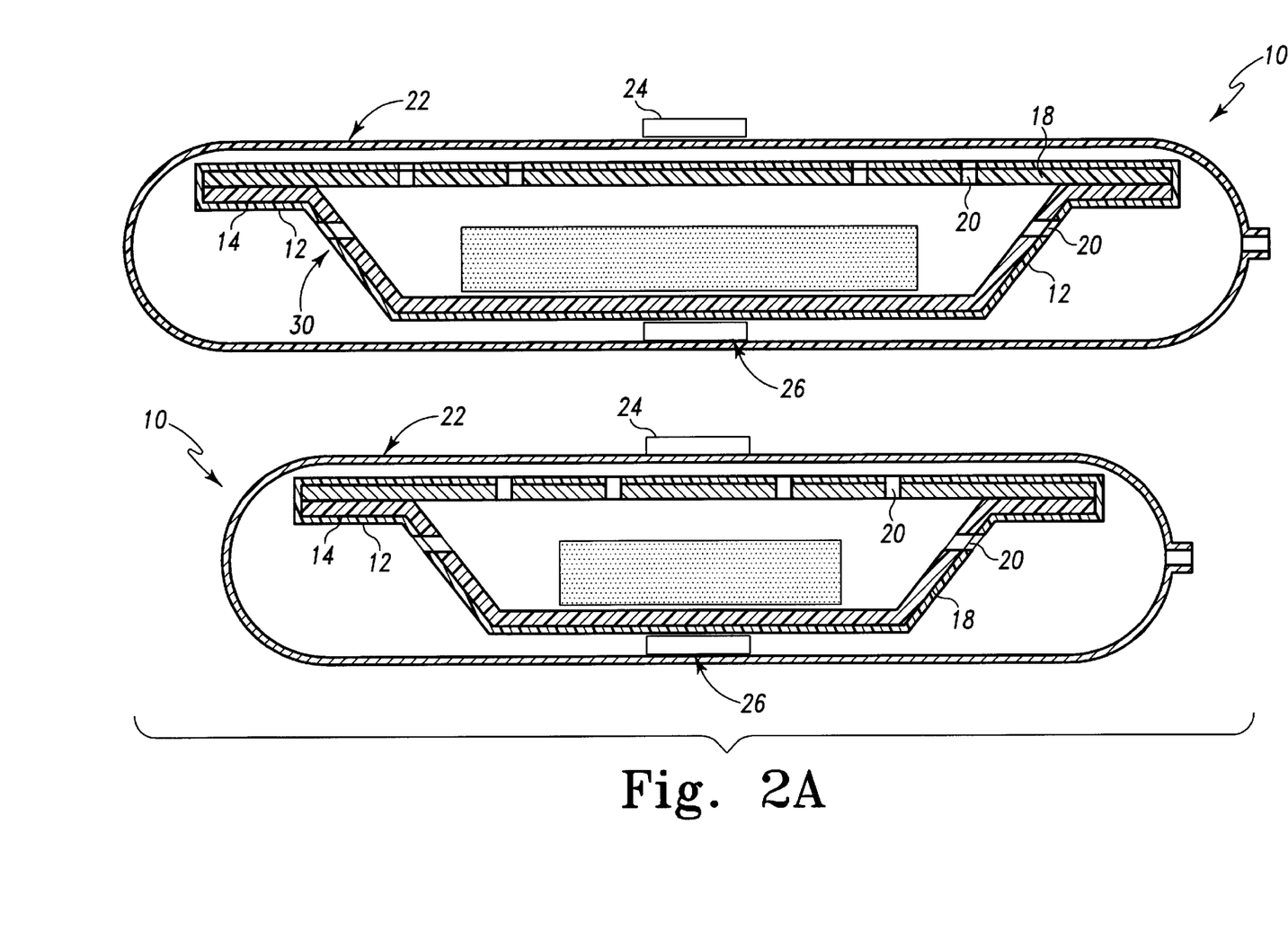
FIG. 2A is a side and cross-sectional view of a package containing a good according to one embodiment of the present invention.
Figure 2B:
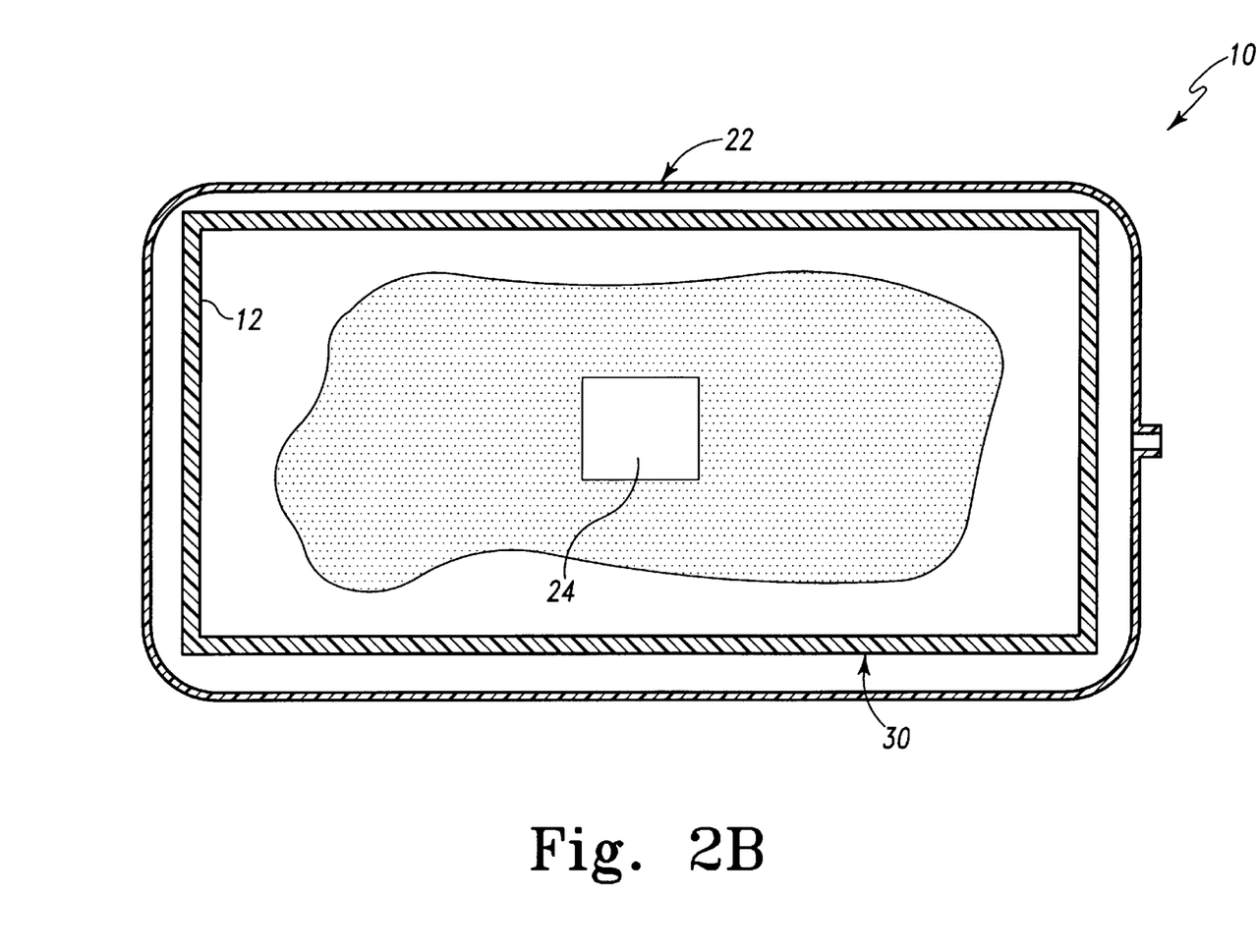
FIG. 2B is a top view of a package containing a good according to one embodiment of the present invention.

Referring now to FIGS. 2A and 2B, a package 10 is shown including a first web in the form of a tray 12 which may include flanges 14 around the perimeter of the tray 12, a good or goods, such as red meat or other oxygen sensitive food and non-food products, disposed above the tray 12, a second web in the form of a gas permeable film material 18, which may also include slits or perforations 20, covering the goods, and a third web in the form of a barrier bag 22 made of a substantially impermeable material which surrounds the tray 12. The good or goods are placed in the tray and wrapped either manually or automatically with a gas permeable film material 18 or other means to hold the good in place forming a wrapped tray 30.

The wrapped tray 30 is disposed within the barrier bag 22. The barrier bag 22 incorporates a first one-way valve 24 such as the one-way valve produced by Plitek LLC of Des Plaines, Ill. on the outside of one side of the barrier bag 22. A second one-way valve 26 is disposed on the inside of the other side of the barrier bag 22.

The barrier bag 22 is shaped similarly to a typical bag with an open end in which to insert the wrapped tray 30. Immediately after inserting the wrapped tray 30 in the barrier bag 22 the two sides of the open end of the barrier bag 22 are sealed. Various sealing techniques can be used as long as the seal is airtight. Heat sealing, zipper seals and adhesive seals are examples of such sealing techniques. A modified atmosphere is introduced through the second one-way valve 26 and at the same time a vacuum is connected to the first one-way valve 24. This simultaneous introduction of the modified atmosphere and use of a vacuum at the same time to remove the oxygenated atmosphere significantly reduces the time for replacement of the oxygenated atmosphere with the modified atmosphere.

In the preferred embodiment, the package 10 can also be used in microwaveable applications since the pressure within the package 10 is self-venting. Unlike existing food packages on the market, the barrier bag does not have to be removed or the wrap removed from the tray 12 or the contents removed from the package or holes punched in the film. Instead, the package 10 can be placed directly in the microwave oven. As the pressure builds inside the package due to the heat and energy generated from the microwave oven and the food products, the one-way valve 24 on the top of the tray 12 will vent, allowing gas to escape and equalizing the pressure within the package 10.

In the preferred embodiment, the tray 12 can be constructed of a thermoformable mono-layer structure of APET (Amorphous Polyethylene Terephthalate) or PVC (polyvinylchloride). The total thickness of the material prior to thermoforming is approximately 0.010 to 0.030 inches. The tray 12 may be made of gas permeable or substantially gas impermeable materials. In the case of red meat or products which may include liquids of any type, the tray material should be dense enough to prevent seepage of the liquid. Absorbent trays such as those supplied by Vitembal (France) or Linpak (US/Europe) or other means (absorbent pad) of absorbing liquids exuded from the meat may be employed.

Also contemplated is a tray 12 which can be constructed of material structures containing polyolefins such as PP (polypropylene)/PVDC (poly vinylidene chloride)/PP with tie layers between the PP and PVDC.

Similarly, another polyolefin contemplated for use in material structures is HDPE (high density polyethylene)/ PVDC/HDPE with tie layers between the HDPE and the PVDC. Still other embodiments are contemplated in which the tray 12 is constructed of a plastic foam, (open or closed cell) such as PS (polystyrene), PP (polypropylene), PVC, and APET and may include a substantially gas impermeable, plastic layer laminated thereto or any combination of plastic, paper, glass, aluminum or coatings, coextrusions or laminations of such materials such that the combination contemplated provide a barrier to oxygen permeation equal to or less than 5 cc-mil per 100 square inches area per day in ambient atmosphere at one atmosphere pressure.

In such an embodiment, the laminated barrier layer can be manufactured from a co-extruded LLDPE/PVDC/LLDPE structure with tie layers between the LLDPE and PVDC layers and with a thickness of approximately 0.003 to 0.006 inches or alternatively, it may be constructed of a polyamide such as nylon or alternatively it may be constructed from a coextruded NYLON/EVOH structure laminated to a LLDPE or LLDPE/LDPE hear sealable layer with tie layers between the NYLON and EVOH layers said structure being commercially available from Allied Speciality Films in the US.

Figure 3:
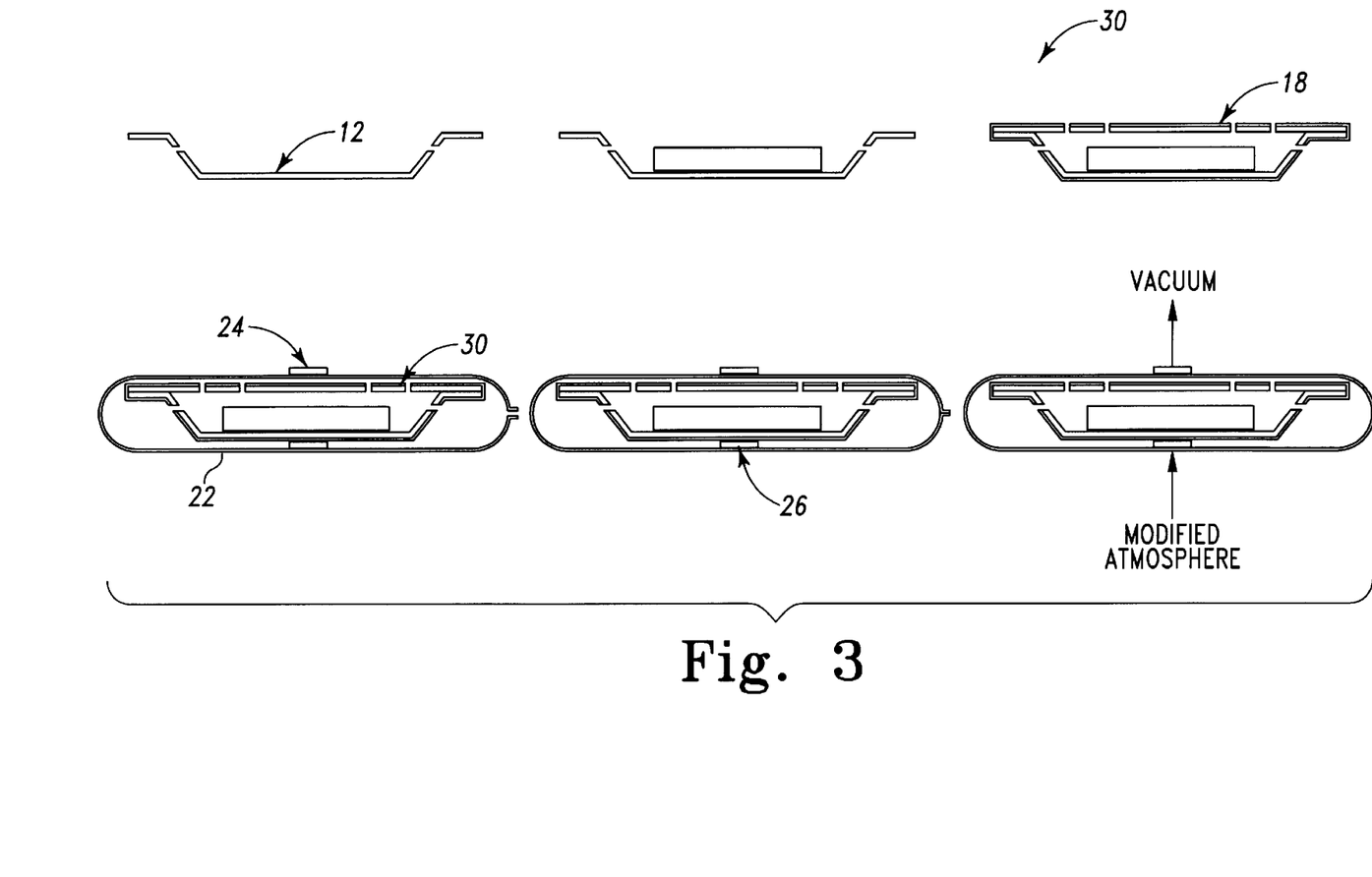
FIG. 3 is an illustration of the process used to manufacture the package described in FIG. 2.

Referring now to FIG. 3, an illustration of the process used to manufacture the package described above is shown. Initially, an empty tray proceeds down a conveyor line or other similar piece of equipment. A good or goods, such as meat, is then disposed within the tray 12 and a PVC film or other similar type of material 18 is overwrapped around the tray, either manually or automatically. The tray, good or goods and gas permeable film forms a wrapped tray 30. In the case of meat, a significant problem with other modified atmosphere packages is weighing and labeling the wrapped tray 30 for the retail customer in accordance with FDA regulations. In the present invention this problem is addressed. Since the wrapped tray 30 is configured precisely as it will appear in the retail store without the need to remove a dome or lid or film, the wrapped tray 30 can be weighed and labeled prior to insertion in the barrier bag 22 and this will eliminate a further step for the grocery store and accomplish compliance with FDA regulations. The wrapped tray 30 is then placed within the barrier bag 22 which includes a first one-way valve 24 and a second one-way valve 26. Next, the two sides of the open end of the barrier bag 22 are heat sealed using commercially available heat sealing technology immediately after insertion of the wrapped tray 30. Then a modified atmosphere gas source is applied to the second one-way valve 26 and a vacuum may be applied to the first one-way valve 24 to assist in faster evacuation of the oxygenated air. As the modified atmosphere gas source is introduced in the second one-way valve 26, the oxygenated air is forced out of the first one-way valve 24 partially by the pressure exerted by the denser modified atmosphere and partially by the force of the vacuum attached to the first one-way valve 24. Finally, the air leaving the first one-way valve 24 can be electronically monitored to determine the parts per million of oxygen in the atmosphere within the barrier bag, which must be less than 500 PPM.

Next, the entire package 10 is placed within a book mailer such as that described in Example 3 below or in another shipping carton or similar packaging configuration and the package is shipped to its destination.

Upon arrival at its destination, the package 10 is removed from the packaging and the barrier bag 22 is opened and the wrapped tray 30 removed. The package 10 is ready for placement in the retail store. In the case of meat, the wrapped tray 30 must be allowed to "bloom" prior to placement for sale to the customer. This process normally takes approximately 15–30 minutes. The process can be accelerated by placing a multiplicity of small holes or perforations 20 in the gas permeable film 18 prior to wrapping the tray 12. Upon removal of the wrapped tray 30 from the barrier bag 22, the perforations 20 facilitate the transfer of oxygen to the good or goods.

Figure 4A:
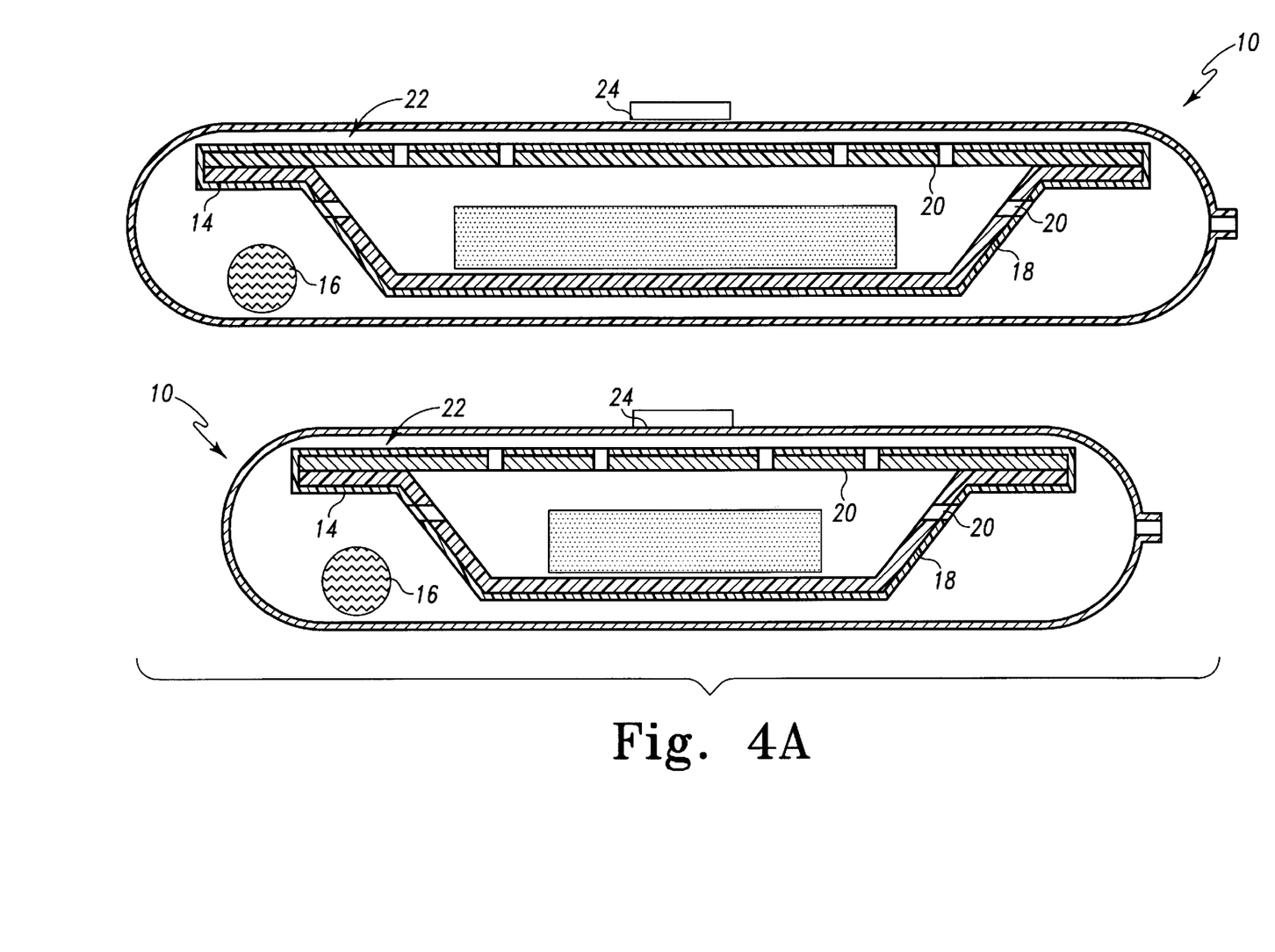
FIG. 4A is a side and cross-sectional view of a package containing a good according to a second embodiment of the present invention.
Figure 4B:
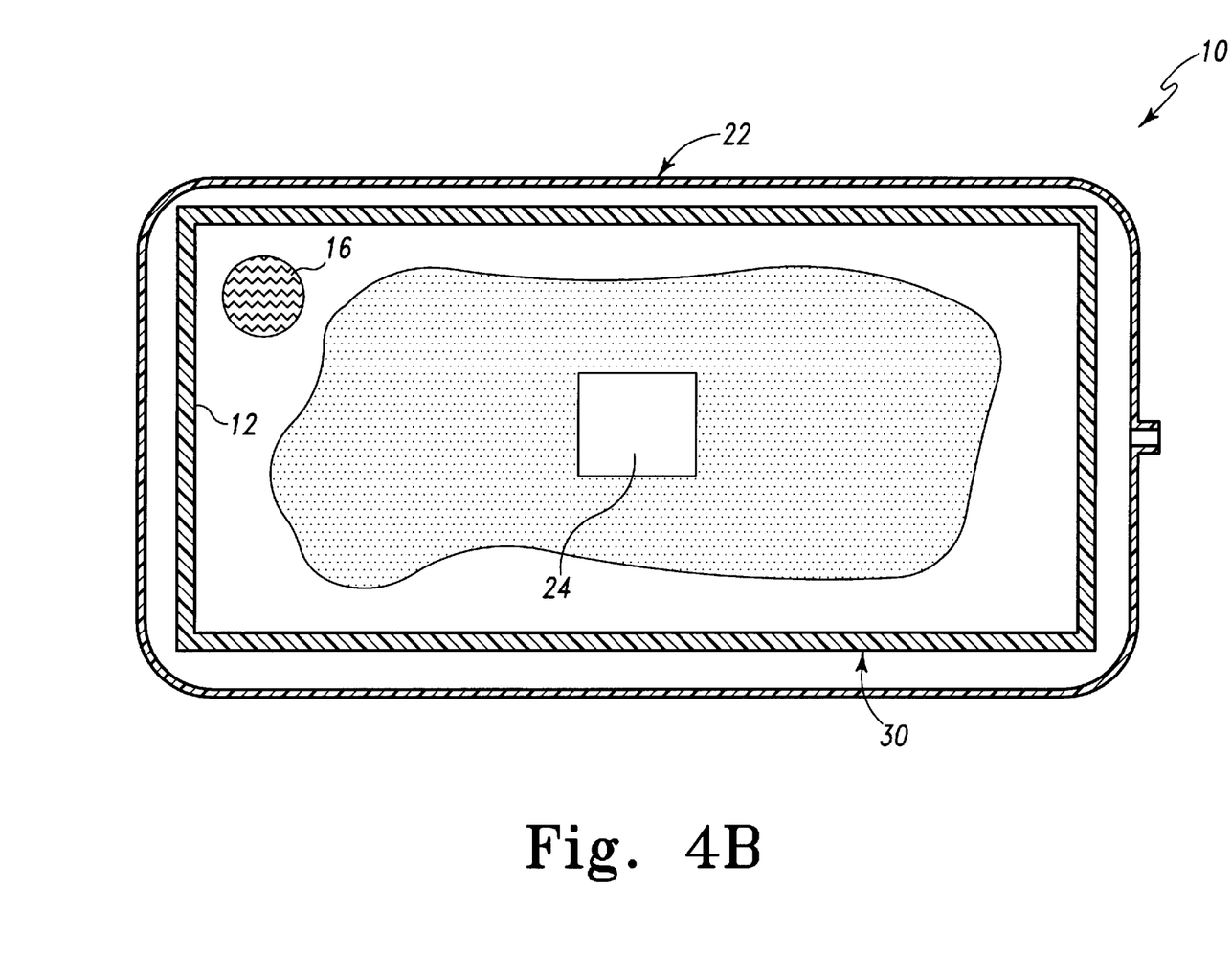
FIG. 4B is a top view of a package containing a good according to a second embodiment of the present invention.

Referring now to FIGS. 4A and 4B, a package 10 is shown including a first web in the form of a tray 12 which may include flanges 14 around the perimeter of the tray 12, solid carbon dioxide 16, a good or goods, such as red meat or other oxygen sensitive food and non-food products, disposed above the tray 12, a second web in the form of a gas permeable film material 18, which may also include slits or perforations 20, covering the goods, and a third web in the form of a barrier bag 22 made of a substantially impermeable material which surrounds the tray 12. The good or goods are placed in the tray and wrapped either manually or automatically with a gas permeable film material 18 or other means to hold the good in place forming a wrapped tray 30.

The wrapped tray 30 is disposed within the barrier bag 22. The barrier bag 22 incorporates a one-way valve 24 such as the one-way valve produced by Plitek LLC of Des Plaines, Ill.

The barrier bag 22 is shaped similarly to a typical bag with an open end in which to insert the wrapped tray 30 and the tube 40 which disposes solid carbon dioxide within the barrier bag 22. Immediately after the carbon dioxide has been introduced the two sides of the open end of the barrier bag 22 are sealed. Various sealing techniques can be used as long as the seal is airtight. Heat sealing, zipper seals and adhesive seals are examples of such sealing techniques.

As the solid carbon dioxide 16 sublimes, it accumulates in the barrier bag 22 and the wrapped tray 30, thus increasing the pressure within the barrier bag 22. Since the oxygen within the barrier bag 22 is less dense than the carbon dioxide, the oxygen gravitates toward the one-way valve 24 and the oxygen is forced out of the one-way valve 24 leaving substantially 100% carbon dioxide within the barrier bag 22. While 100% carbon dioxide is desirable, an atmosphere within the barrier bag 22 of less than 500 PPM oxygen is satisfactory, especially for red meat. Alternatively, a vacuum can be applied to the one-way valve 24 to accomplish quick evacuation of the oxygen.

Figure 5:
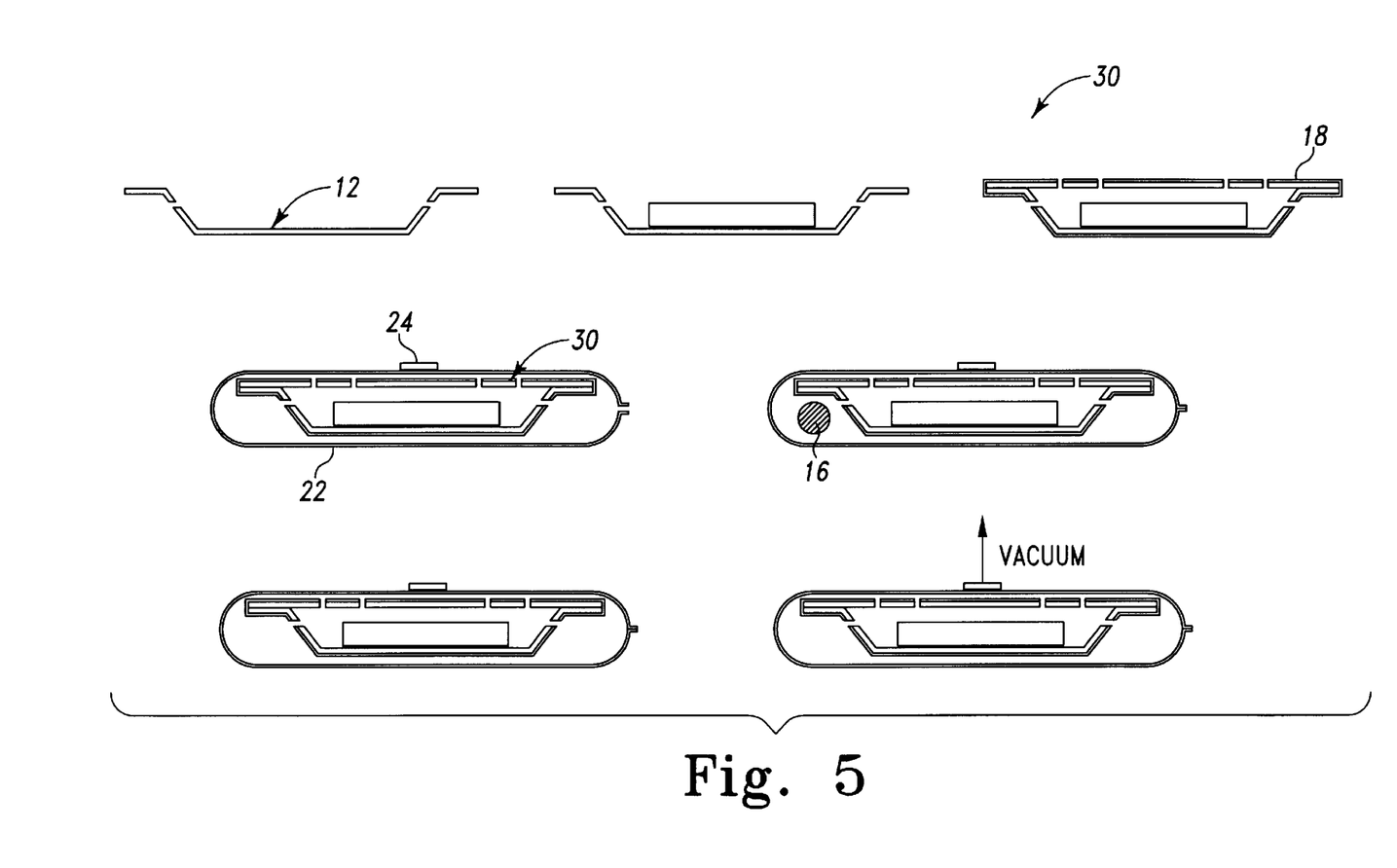
FIG. 5 is an illustration of the process used to manufacture the package described in FIG. 4.

Referring now to FIG. 5, an illustration of the process used to manufacture the package described above is shown. Initially, an empty tray proceeds down a conveyor line or other similar piece of equipment. A good or goods, such as meat, is then disposed within the tray 12 and a PVC film or other similar type of material 18 is overwrapped around the tray, either manually or automatically. The tray, good or goods and gas permeable film forms a wrapped tray 30. In the case of meat, a significant problem with other modified atmosphere packages is weighing and labeling the wrapped tray 30 for the retail customer in accordance with FDA regulations. In the present invention this problem is addressed. Since the wrapped tray 30 is configured precisely as it will appear in the retail store without the need to remove a dome or lid or film, the wrapped tray 30 can be weighed and labeled prior to insertion in the barrier bag 22 and this will eliminate a further step for the grocery store and accomplish compliance with FDA regulations. The wrapped tray 30 is then placed within the barrier bag 22 which includes a one-way valve 24. Dry ice or solid carbon dioxide 16 is then disposed in the barrier bag 22 and outside of the wrapped tray 30. Next, the two sides of the open end of the barrier bag 22 are heat sealed using commercially available heat sealing technology immediately after insertion of the solid carbon dioxide 16. The barrier bag 22 can then be sent to a holding area to allow the carbon dioxide 16 to sublime and force the oxygen from the barrier bag 22 or a vacuum can be applied to the one-way valve 24 to accomplish the evacuation of the oxygen in a quicker time period.

Next, the entire package 10 is placed within a book mailer such as that described in Example 3 below or in another shipping carton or similar packaging configuration and the package is shipped to its destination.

Upon arrival at its destination, the package 10 is removed from the packaging and the barrier bag 22 is opened and the wrapped tray 30 removed. The package 10 is ready for placement in the retail store. In the case of meat, the wrapped tray 30 must be allowed to "bloom" prior to placement for sale to the customer. This process normally takes approximately 15–30 minutes. The process can be accelerated by placing a multiplicity of small holes or perforations 20 in the gas permeable film 18 prior to wrapping the tray 12. Upon removal of the wrapped tray 30 from the barrier bag 22, the perforations 20 facilitate the transfer of oxygen to the good or goods.

Figure 6:
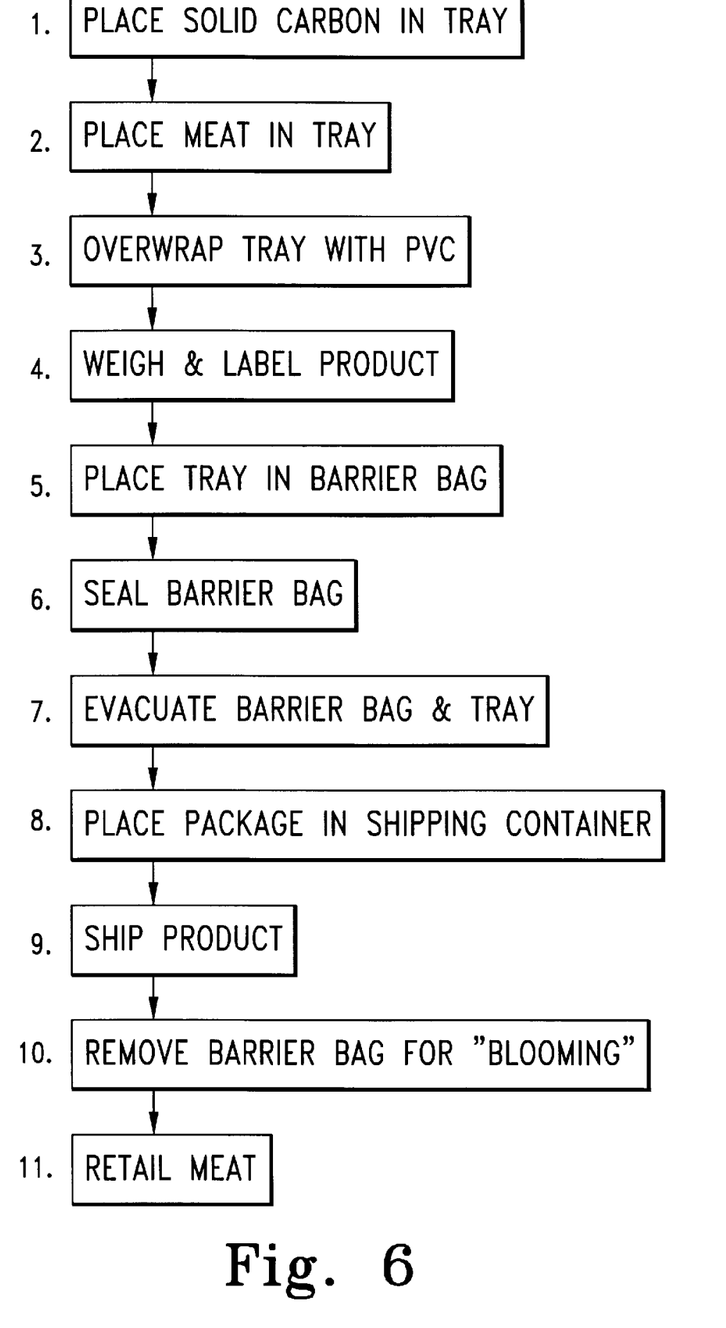
FIG. 6 is a flow chart which illustrates the process described in FIGS. 2 and 4.

FIG. 6 is a flow chart for the process described in the present invention. It is understood that the process as shown in FIGS. 2 and 4 may be modified as described herein.

Figure 7:
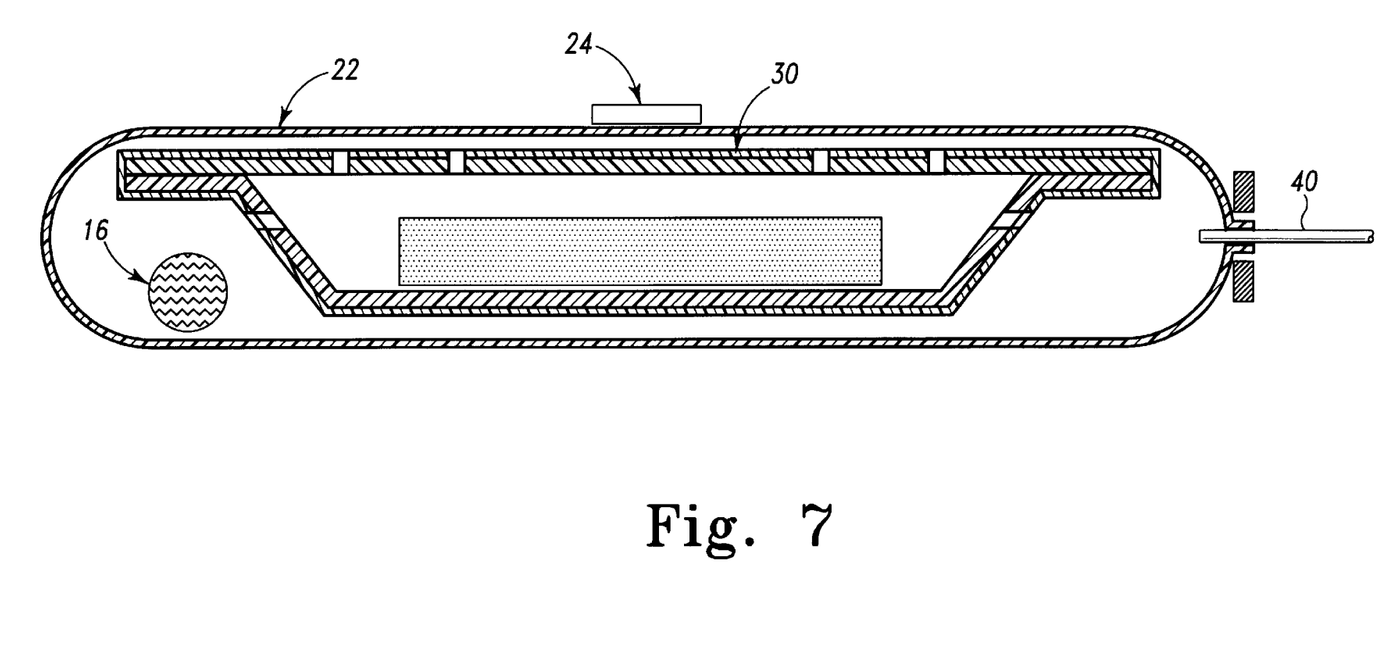
FIG. 7 is a cross-sectional view of a package containing a good which describes one method of insertion of carbon dioxide and heat sealing the barrier bag.

Referring now to FIG. 7, a simple procedure is illustrated for disposing the solid carbon dioxide 16 within the barrier bag 22 as referenced in FIGS. 4 and 5. A tube 40 connected to a liquid carbon dioxide source is inserted in the open end of the barrier bag 22. The liquid carbon dioxide flows through the tube using a pump or pneumatics or some other similar type of mechanism to force the liquid carbon dioxide through the tube. As the liquid carbon dioxide expands upon exiting the tube it solidifies. After a sufficient amount of carbon dioxide is disposed within the barrier bag, the tube is withdrawn from the barrier bag and the open end of the barrier bag is immediately heat sealed using heat seal bars on either side of the open ends of the barrier bag or other commercially available sealing techniques.

Finally, a vacuum pump or vacuum cleaner hose can be applied to the one-way valve 24 to remove the oxygen if rapid evacuation of oxygen is desired.

Several experiments were conducted on the packages and further describe the invention. The results are described below:

1. A series of samples were produced comprising a Polyester tray obtained from ACI (Australia) having the dimensions 9.75"×5.625"×1.375" and weighing 26 grams and a polyethylene Zipper bag commercially available from Glad and sold as a food storage bag and having a thickness of 0.002". A hole approximately 0.090" in diameter was placed in one surface of the bag. The hole in the bag was covered with a one-way valve obtained from Plitek LLC of Des Plaines Ill. (The valve is supplied with an adhesive and a special silicone oil so that the valve can be permanently adhered to the bag).

A weighed amount of solid carbon dioxide was placed into each bag. The tray was placed in the bag and the Zipper closure mechanically sealed. To prevent the ambient air from entering the bag the Zipper seal was heat sealed using a heat sealer purchased from Abbeon Cal of Santa Barbara, Calif. to contain the tray and solid carbon dioxide within the barrier bag.

The oxygen level in the confined space was measured after no solid carbon dioxide was visible by extracting a 10 cc gas sample using a gas tight syringe by inserting the syringe through the polyethylene bag to obtain the gas sample.

Figure 8:
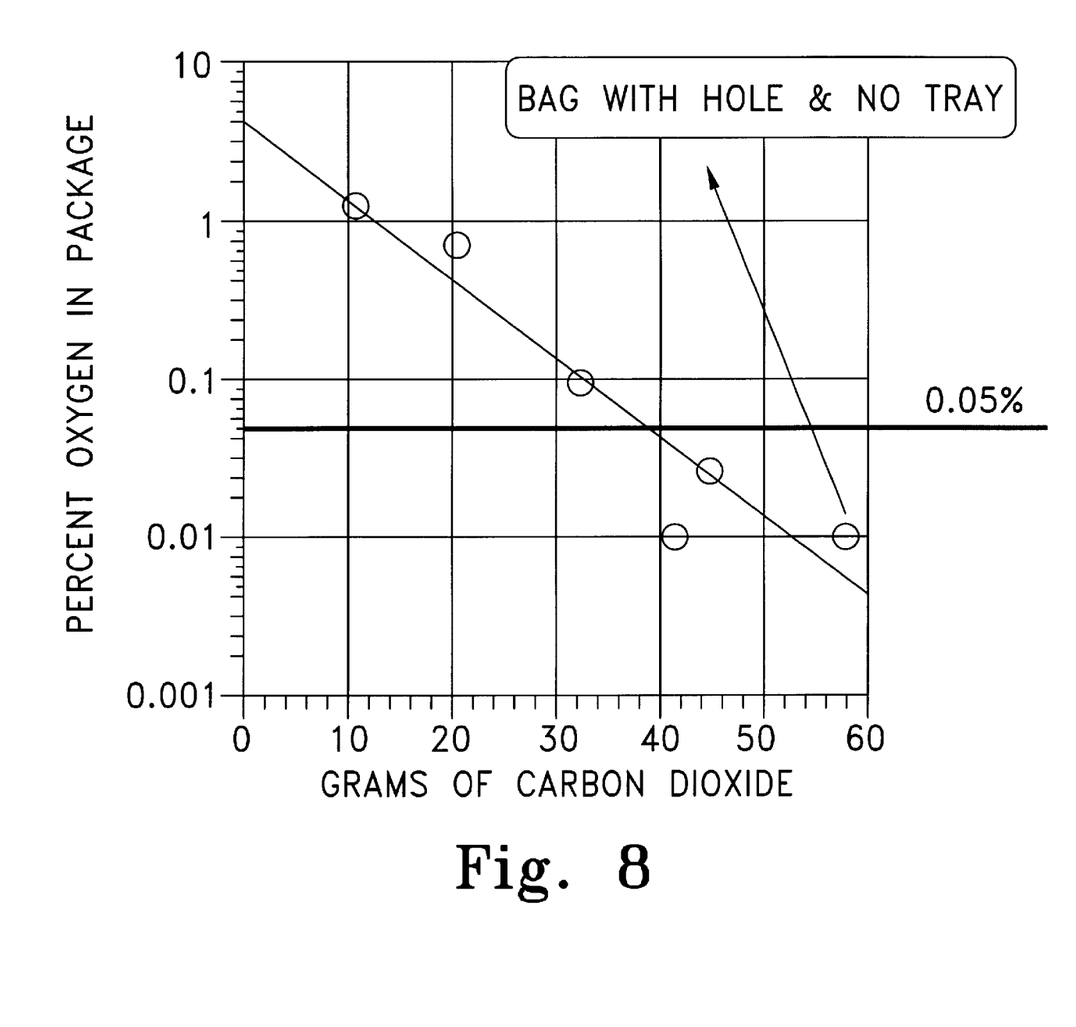
FIG. 8 is a graphical illustration showing the relationship between the weight of the carbon dioxide and the final oxygen concentration in the package.

The oxygen level in the extracted gas sample was injected into a Servomex Model 756A oxygen analyzer for quantitative determination. The results for several different quantities of solid carbon dioxide are shown in FIG. 8. Also included in FIG. 8 is a data point representing a Glad Zipper bag charged only with solid carbon dioxide sealed as the others described above but which contained an 0.080 hole instead of a one way valve.

FIG. 8 shows the relationship between the weight of solid carbon dioxide and the final oxygen concentration in the package. It can be seen that the level of oxygen can be controlled by varying the amount of solid carbon dioxide initially present in the package. For reference, a line has been drawn to show the preferred oxygen level for the long term storage of fresh cut meats.

It is recognized that polyethylene is not an appropriate long term barrier to oxygen. Its use in these examples demonstrates the essence of the invention (the ingress of oxygen into the package through the polyethylene film is minimal over the short time required to conduct the experiment) but is not presented as the most suitable material for long term containment of low oxygen environments.

It is well established that an effective oxygen barrier film must have an oxygen permeability equal to or less than 5 cc-mil per 100 square inches per day in ambient atmosphere at one atmosphere pressure.

It is envisioned that heat sealable shrinkable barrier films such as PVC (available from Consolidated Plastics Co. Of Ohio or Capran oxyshield available from Allied Signal) also may be used as the outer barrier bag to vary the package configuration to suit individual customer needs. For example, shrinking the outer barrier bag to which has been adhered a Plitek valve will serve to reduce the volume of ambient air surrounding the food or non-food product and provide an esthetically pleasing package. This reduction in volume will serve to reduce the oxygen content within the package and may be used in combination with other aspects of the invention described, such as vacuum, back flushing, solid carbon dioxide).

2. The experiments in Example 1 were repeated except that a vacuum source (A household vacuum cleaner was used, although it is recognized that vacuum chambers such as those available from Koch Supplies Inc. of Kansas City, Mo. may be used in a commercial setting) was applied to the one-way valve to collapse the barrier bag around the tray thus reducing the volume of air contained in the package. The oxygen levels measured are shown in Table 1 and demonstrate that a vacuum may be used to reduce the amount of solid carbon dioxide used to achieve a desired final oxygen concentration.

It is understood that combinations of vacuum and oxygen absorbers such as those available from Multisorb Technologies Inc. of Buffalo, N.Y. may be used to reduce the amount of solid carbon dioxide used or to increase production rates or to handle situations when high vacuum equipment is not available.

TABLE I

| Weight of CO2 (Grams) | % O2 Level Without Vacuum | Weight of CO2 (Grams) | % O2 Level With Vacuum |
|---|---|---|---|
| 10.9 | 1.2 | 11.3 | 0.9 |
| 20.8 | 0.7 | 21.1 | 0.3 |
| 32.5 | 0.09 | 36.1 | 0.02 |
| 45 | 0.025 | | |

Prior art required application of a vacuum before the package was sealed as in the master bag methods or individual vacuum packages or on Multivac machines. In the present invention, the ability to evacuate the closed package affords the opportunity to increase production rates and simplify any necessary vacuum equipment.

Additionally, the retail sale of vacuum packaged fresh meats has not been successful because fresh meat so packaged assumes a purple color and is not consumer acceptable. Since no means is provided for "blooming" except the destruction of the package and rewrapping of the meat, vacuum packaging of fresh meats has not gained wide spread acceptance. In the present invention the fresh meat may be vacuum packaged and the barrier bag removed prior to retail sale to effect "blooming". No rewrapping of the meat is required because the PVC overwrapped package is ready for retail sale.

3. Since the present invention includes a flexible outer barrier bag and a source of gas pressure inside the barrier bag, it is possible to form a complete shipping package. For example the experiment described in Example 1 was repeated except that a paperboard package (similar to a "book mailer" available from Consolidated Plastics Co. of Ohio) was constructed to hold the lower barrier bag surface flat with the bottom of the food tray while providing a cutout for the opposite surface of the barrier bag to expand as the solid carbon dioxide sublimed thus forming a "dome" and a cost effective total package. Alternatively the "book mailer" may be constructed from plastic material such as polystyrene foam or other foamed plastic materials which may serve to insulate the package from external temperature changes since foamed plastic materials such as these are good insulators.

An additional benefit of the package is that it provides a cushion for product shipment and additional package volume to contain carbon dioxide. The additional package volume and thus additional carbon dioxide volume is important in the packaging of fresh meat as the meat absorbs carbon dioxide. For packages made with rigid domes this absorption can cause the dome to collapse.

4. PVC film approximately 0.0006 inches thick obtained from Vitembal (France) was wrapped around a polyester tray obtained from ACI weighing approximately 26.5 grams and having the dimensions 9.75"×5.625'×1.375". The PVC overwrapped tray was placed in a Glad brand Zipper bag to which a one-way valve was adhered as previously described. Approximately 50 grams of solid carbon dioxide was placed in the bag after the PVC film surface was perforated with an 18 gauge syringe needle to allow for the passage of carbon dioxide and air. The bag was heat sealed as described before. The oxygen level in the spaces defined by the tray/PVC Film/barrier bag was measured according to the method described in Example 1 and found to be less than 500 PPM.

5. Example 4 was repeated except that a vacuum was applied (as in Example 2) to the barrier bag to reduce the volume of oxygen contained in the tray/PVC film/barrier bag. In this Example of the oxygen level was found to be less than 500 PPM.

6. To demonstrate the use of other barrier bag materials, 10 Grams of solid carbon dioxide was placed into a 10.5'× 8.5"×1" Polyester tray obtained from ACI (Australia). The tray containing only the solid carbon dioxide was placed into a 10"×12" plastic barrier bag which as purchased was heat sealed on three sides. The bag was obtained from Tilia Co. of California and had an average thickness of 0.008".

A hole approximately 0.090" in diameter was placed in one surface of the barrier bag. The hole in the barrier bag was covered with a one-way valve obtained from Plitek LLC of Des Plaines, Ill. The open side of the barrier bag was heat sealed using a heat sealer purchased from Abbeon Cal of Santa Barbara, Calif. to contain the tray and solid carbon dioxide within the barrier bag.

A vacuum hose was placed over the valve in the barrier bag and applied until the barrier bag had completely collapsed around the tray. After 10–15 minutes the barrier bag had reinflated demonstrating the sublimation of the solid carbon dioxide.

The oxygen level in the confined space was measured after no solid carbon dioxide was visible by extracting a 10 cc gas sample using a gas tight syringe by inserting the syringe through the barrier to obtain the gas sample as previously described.

The oxygen level in the extracted gas sample was injected into a Servomex Model 756A oxygen analyzer for quantitative determination. It was found that the oxygen level in the confined space was less than 500 PPM by volume after the complete sublimation of the solid carbon dioxide.

7. Example 6 was repeated except that no vacuum was used and a barrier bag having the dimensions 10"×13"× 0.0025" (E-Z PAK High Barrier DELI Pouches obtained from Koch of Kansas City, Mo.) and a polyester tray obtained from ACI (Australia) having dimensions of 6.75"× 10.75"×1.375" was used. It was found that 46.8 grams of solid carbon dioxide yielded a final oxygen level of 300 PPM.

8. To demonstrate the use of gaseous carbon dioxide and vacuum to purge the container of unwanted oxygen, Example 6 was repeated except that a 0.250 inch hole was made in the barrier bag. A vacuum source was applied to the Plitek valve while gaseous carbon dioxide was introduced into the package through the 0.250 inch hole. The hole was sealed with a gas impermeable tape (duct tape available from local hardware store) and the oxygen content of the container measured as previously described. The oxygen content was found to be <500 PPM.

While the present invention can be used for the shelf life extension of food and non-food products in commercial markets, it also offers a lower cost alternative to products which are sold directly to consumers and which are used to preserve food products in a frozen state.

For example, consumers can purchase barrier bags and a vacuum/heat sealing machine to preserve food in a frozen state (Tilia Co. of California U.S. Pat. No. Re. 34,929 & European Patent # 0216327).

In the Tilia system the consumer must purchase a machine and bags in order to preserve food in the frozen state. In the present invention a barrier bag fitted with a Plitek valve and an adhesive seal may be used with a household vacuum cleaner to accomplish the same end. Alternatively, a heat seal using an inexpensive heat sealer (EUROSEALER) such as described in U.S. Pat. No. 5,142,123 may be used to seal the barrier bag.

The food item is placed in the barrier bag and sealed from the ambient atmosphere with an adhesive or heat seal. A household vacuum is applied to the Plitek valve to remove or reduce the amount of oxygen within the bag unlike the Tilia system which requires an expensive machine and special bags available only from Tilia. Since in this instance the food product will eventually be frozen, the amount of oxygen left in the bag is not as critical as has been discussed before for food stored at higher temperatures.

Another application envisioned for the present invention involves microwaving of food products. In most microwave applications the container used to hold the food must be vented by slitting or otherwise puncturing the container prior to heating in the microwave oven. The present invention may therefore be used for this purpose, as the Plitek valve will vent steam or other volatiles generated as the food is heated.

9. To demonstrate the microwave concept, a turkey burger was sealed inside an ovenable bag (Reynolds Oven Bags available at local supermarkets) which had been fitted with a Plitek valve as previously described. The bag and burger was cooked on high for two minutes in a microwave oven. The bag expanded during the heating period but displayed no openings to the ambient environment at the end of the cooking period.

An additional application for the present invention involves the adaptation of commercially available vacuum chambers such as those available from Koch Supplies Inc. of Kansas City, Mo. in order to create a modified atmosphere. Presently this type of equipment is used to create vacuum packages comprised of a barrier bag and food product only. In these instances the food product such as meat is discolored due to the lack of oxygen and attempts to retail the product in this state is difficult.

It is well established that consumers prefer meat which has "bloomed" or has a bright red color.

In some instances the vacuum chambers are supplied with gas flushing features so that a modified atmosphere can be established using gaseous materials such as carbon dioxide, nitrogen, mixtures thereof or other suitable gaseous materials. However, even in this instance while bacteria growth may be inhibited due to the presence of carbon dioxide, "blooming" is not permitted unless the vacuum package is destroyed and the meat repacked before retail sale. This obviously is not cost effective. Other problems with vacuum packaging techniques have been described (Controlled/Modified Atmosphere/Vacuum Packaging of Foods Brody, Food & Nutrition Press, Inc. 1994).

The present invention can improve the operation of these vacuum chambers and permit the meat to "bloom" if solid carbon dioxide or other controlled sources of carbon dioxide previously described are incorporated within the barrier bag/PVC overwrapped tray combination. The barrier bag may or may not be fitted with the one-way valve depending upon the specific vacuum chamber used.

The use of polystyrene foam or other foamed plastics provides the lowest cost tray for containing the fresh meat or other fresh food products. Since polystyrene foam has a cellular structure which contains air and therefore, oxygen, it may require special handling. Therefore, a series of experiments were conducted to evaluate the use of such materials within the present invention. These are as follows:

10. Three packages comprising a polystyrene foam tray obtained from Vitembal France) having the dimensions 8.25"×11.75"×1.25" and an average thickness of 0.270" and a Tilia barrier bag fitted with a Plitek valve as previously described were made. A weighed amount of solid carbon dioxide (10 grams, 20 grams and 60 grams) was placed into each foam tray/barrier bag.

The barrier bags were evacuated through the Plitek valve using a Tilia vacuum machine heat sealed to isolate the internal bag environment from ambient conditions. The oxygen level in the package was measured as previously described after the solid carbon dioxide had sublimed. The lowest oxygen level measured was 0.60% corresponding to the calculated volume of oxygen contained in the foam cells at the start of the experiment and which diffuses out of the foam cells into the environment surrounding the foam tray.

It appears that the solid carbon dioxide sublimation rate is faster than the diffusion of carbon dioxide into the foam cells. Thus while the environment surrounding the foam tray will contain less than 500 PPM of oxygen after the sublimation is complete, as time increases the oxygen in the foam cells diffuses out thus raising the final concentration of oxygen in the environment surrounding the foam tray to a level unacceptable for the long term storage of fresh meat.

11. The three trays used in Example 10 were repackaged as described in Example 10 and the oxygen level measured again. In this instance the final oxygen level approached an acceptable level of 500 PPM.

The results of Examples 10 and 11 suggest that polystyrene foam trays can be used with this invention if they are pretreated or made to equilibrate with a 100% carbon dioxide environment, prior to being used to package fresh meat products. In order to accomplish this pretreatment, the foam trays may be stored in a sealed barrier bag containing solid carbon dioxide and to which has been fitted a Plitek valve. In other words, the present invention can be used to render the polystyrene foam trays suitable for use in this invention. The pretreatment is easily accomplished at the time of tray manufacture. The pretreatment process will be complete by the time the trays arrive at a food packaging plant. They can then be removed from the barrier bag and used to contain fresh meat or other fresh goods according to this invention.

12. An alternative method of reducing the final oxygen content within the foam tray/barrier bag structure described in Examples 10 and 11 was investigated.

A series of eight flat foam samples having the same dimensions 7.5"×3.75"×0.250" were individually packaged in E-Z PAK High Barrier DELI Pouches obtained from Koch of Kansas City, Mo. to which had been fitted a Plitek valve as previously described.

While all samples were packaged with various amounts of solid carbon dioxide from 10 grams to 61 grams, an oxygen absorber (obtained from Multisorb of Buffalo, N.Y. designated as 1406CG05 M-200) and 10 cubic centimeters of water (to activate the oxygen absorber) was included in half or four of the samples. The final oxygen levels were measured as previously described. The lowest oxygen level obtained for the samples not containing the oxygen absorbers was 0.35%. For the samples containing the oxygen absorbers, oxygen levels less than 500 PPM were recorded. Thus the incorporation of an oxygen absorber with solid carbon dioxide may be used to achieve a final oxygen level of less than 500 PPM.

13. In a further example, a sample of open cell foam having the dimensions 7.5"×9.75" and a thickness of 0.125" (85% open cells obtained from Vitembal France) was packaged according to the method described in Example 12 with 26.4 grams of solid carbon dioxide.

The final oxygen concentration obtained was 0.4% suggesting that the diffusion of carbon dioxide into open cell foam is slower than the sublimation of the solid carbon dioxide.

14. An alternative method of reducing the final oxygen content within the foam tray/barrier bag structure described in examples 10 and 11 is to fit the barrier bag surround the polystyon foam tray with two Plitek valves such that the environment surrounding the polystyon foam tray may be charged more than once. In other words the oxygen which diffuses out of the foam cells after the initial establishment of a 100% carbon dioxide environment can be removed by gas flushing the barrier bag with 100% carbon dioxide through one Plitek and evacuating the oxygen through a second Plitek valve. This arrangement is shown in FIG. 2.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

Other modifications may be made without departing from the ambit of the invention, the nature of which, is to be determined from the foregoing description and appended claims.

What is claimed is:

1. A modified atmosphere package for storing oxygen sensitive goods, comprising:

a gas impermeable tray for holding the oxygen sensitive goods, a gas permeable film positioned over and adjacent to said tray thereby covering the goods and forming a wrapped tray, said wrapped tray disposed within a barrier bag, sealing means for closing the open end of said barrier bag, a first one-way valve located on the outside of one side of said barrier bag and a second one-way valve located on the inside of the other side of said barrier bag whereby a modified atmosphere gas source is introduced through said second one-way valve at the same time as a vacuum is applied to said first one-way valve thus accomplishing rapid atmosphere replacement within said barrier bag.

2. The package of claim 1, wherein said sealing means is a heat seal for closing said open end of said barrier bag.

3. The package of claim 1, wherein said sealing means is a gastight zipper seal for closing said open end of said barrier bag.

4. The package of claim 1, wherein said gas permeable film contains multiple perforations to assist oxygen transfer when said wrapped tray is removed from said barrier bag.

5. A modified atmosphere package for storing oxygen sensitive goods, comprising:

a gas impermeable tray for holding the oxygen sensitive goods, a gas permeable film positioned over and adjacent to staid tray thereby covering the goods and forming a wrapped tray, said wrapped tray disposed within a barrier bag, sealing means for closing the open end of said barrier bag, a first one-way valve located on the outside of one side of said barrier bag and a second one-way valve located on the inside of the other side of said barrier bag whereby said package is placed in a microwave oven and as heat and pressure build within said package, air escapes from said second one-way valve to provide for the integrity of said package and to facilitate the heating of the food product.

6. The package of claim 5, wherein said sealing means is a heat seal for closing said open end of said barrier bag.

7. The package of claim 5, wherein said sealing means is a gastight zipper seal for closing said open end of said barrier bag.

8. The package of claim 5, wherein said gas permeable film contains multiple perforations to assist oxygen transfer when said wrapped tray is removed from said barrier bag.

* * * * *